US008266625B2

(12) United States Patent
Yuki (10) Patent No.: US 8,266,625 B2
(45) Date of Patent: Sep. 11, 2012

(54) PRIORITIZATION AND TERMINATION OF IMAGE PROCESSING APPARATUS APPLICATIONS BASED ON MEMORY USAGE AND USER LOGIN TYPE

(75) Inventor: Naoto Yuki, Yokosuka (JP)

(73) Assignee: Canon Kabushiki Kaisha (JP)

( * ) Notice: Subject to any disclaimer, the term of this patent is extended or adjusted under 35 U.S.C. 154(b) by 363 days.

(21) Appl. No.: 12/553,605

(22) Filed: Sep. 3, 2009

(65) Prior Publication Data

US 2010/0064288 A1 Mar. 11, 2010

(30) Foreign Application Priority Data

Sep. 8, 2008 (JP) ................................. 2008-229771

(51) Int. Cl.
*G06F 9/50* (2006.01)
(52) U.S. Cl. .......................... 718/103; 718/100; 718/102
(58) Field of Classification Search .................. None
See application file for complete search history.

(56) References Cited

U.S. PATENT DOCUMENTS

| | | | | |
|---|---|---|---|---|
| 2005/0034129 | A1* | 2/2005 | Chew | 718/100 |
| 2006/0271936 | A1* | 11/2006 | Matsuda et al. | 718/102 |
| 2007/0127061 | A1* | 6/2007 | Itagaki | 358/1.15 |
| 2008/0184241 | A1* | 7/2008 | Headrick et al. | 718/102 |

FOREIGN PATENT DOCUMENTS

| | | |
|---|---|---|
| JP | 2003-015892 A | 1/2003 |
| JP | 2006-285871 A | 10/2006 |
| JP | 2007-279792 A | 10/2007 |

* cited by examiner

*Primary Examiner* — Jennifer To
*Assistant Examiner* — Benjamin Wu
(74) *Attorney, Agent, or Firm* — Rossi, Kimms & McDowell LLP (57) ABSTRACT

An image processing apparatus that enables to start an application that is required to start by stopping an application that is not used by a user to reserve an available memory capacity when receiving a startup request. A first determination unit determines a memory usage of the application that receives the startup instruction. A second determination unit determines an available memory capacity. A third determination unit determines an application that is not used by a user. A stopping unit stops the application determined by the third determination unit among the executing applications when the memory usage determined by the first determination unit is more than the available memory capacity determined by the second determination unit. A starting unit starts the application that receives the startup instruction using the available memory capacity that increases because the stopping unit stops the determined application.

6 Claims, 8 Drawing Sheets

| ID 401 | APPLICATION NAME 402 | MEMORY USAGE 403 | STATUS 404 | LOGIN TYPE 405 |
|---|---|---|---|---|
| 1 | LOCAL APPLICATION 1 | 20MB | START | LOCAL LOGIN |
| 2 | LOCAL APPLICATION 2 | 30MB | START | LOCAL LOGIN |
| 3 | REMOTE APPLICATION 1 | 10MB | START | REMOTE LOGIN |
| 4 | REMOTE APPLICATION 2 | 20MB | START | REMOTE LOGIN |
| 5 | SYSTEM APPLICATION 1 | 10MB | START | SYSTEM LOGIN |
| 6 | SYSTEM APPLICATION 2 | 40MB | STOP | SYSTEM LOGIN |
| .. | .. | .. | .. | .. |

FIG.5

| USER | LOGIN TYPE |
|---|---|
| USER A | REMOTE LOGIN |
| USER B | REMOTE LOGIN |
| USER C | REMOTE LOGIN |
| : | : |

| ID | APPLICATION NAME | MEMORY USAGE | STATUS | LOGIN TYPE |
|---|---|---|---|---|
| 1 | LOCAL APPLICATION 1 | 20MB | STOP | LOCAL LOGIN |
| 2 | LOCAL APPLICATION 2 | 30MB | STOP | LOCAL LOGIN |
| 3 | REMOTE APPLICATION 1 | 10MB | START | REMOTE LOGIN |
| 4 | REMOTE APPLICATION 2 | 20MB | START | REMOTE LOGIN |
| 5 | SYSTEM APPLICATION 1 | 10MB | START | SYSTEM LOGIN |
| 6 | SYSTEM APPLICATION 2 | 40MB | START | SYSTEM LOGIN |
| .. | .. | .. | .. | .. |

PRIORITIZATION AND TERMINATION OF IMAGE PROCESSING APPARATUS APPLICATIONS BASED ON MEMORY USAGE AND USER LOGIN TYPE

BACKGROUND OF THE INVENTION

1. Field of the Invention

The present invention relates to an image processing apparatus, an application startup management method, and a storage medium storing control program therefor.

2. Description of the Related Art

In recent years, an image processing apparatus called a multifunctional peripheral device that includes functions of respective devices such as a printer, a copier, a facsimile, and a scanner, within a single body is known.

Applications corresponding to the respective devices such as a printer, a copier, a facsimile, and a scanner have been installed into a conventional multifunctional peripheral device beforehand, and resources (memory etc.) sufficient to operate these applications have been provided.

However, the applications installed into the conventional multifunctional peripheral device are insufficient to meet needs of each client, such as to add a new function by combining a printer and a facsimile. Therefore, a multifunctional peripheral device in recent years realizes a need of client by allowing to install a new application as an option according to a need of client and to operate the application.

However, when operating a newly installed application, the memory capacity, which is sufficient to operate the preinstalled applications, may become insufficient.

Japanese laid-open patent publication (Kokai) No. 2006-285871 (JP2006-285871A) discloses a technique that displays a warning or an error message in order to avoid an error due to memory shortage when the maximum memory usage of the application that is going to start is larger than the available memory capacity.

Further, there are some techniques for using larger number of built-in applications.

Japanese laid-open patent publication (Kokai) No. 2003-15892 (JP2003-15892A) discloses a technique that classifies applications into a memory-resident type and a transient type and that starts an application that receives a startup request after forcefully terminating a transient type application when the memory capacity is insufficient.

Moreover, Japanese laid-open patent publication (Kokai) No. 2007-279792 (JP2007-279792A) discloses a technique that accumulates frequency of use for time periods of a plurality of applications installed into the multifunctional peripheral device and that starts a frequently-used application and stops an infrequently-used application for each time period.

However, since the prior art mentioned above requires to classify applications into the memory-resident type and the transient type beforehand, or to accumulate frequency of use by executing applications in a predetermined time, there is a problem of increasing burden on a user.

Further, since the above-mentioned prior arts do not consider a using condition of an application by a user, there is a problem that the application stops even if the user is using the application.

SUMMARY OF THE INVENTION

The present invention provides an image processing apparatus and an application startup management method that are capable of starting an application that is required to start by stopping an application that is not used by a user to reserve an available memory capacity when receiving a startup request.

Accordingly, a first aspect of the present invention provides an image processing apparatus that can execute a plurality of applications, comprising a first determination unit adapted to determine, when one of the plurality of applications receives a startup instruction, a memory usage of the application that receives the startup instruction, a second determination unit adapted to determine an available memory capacity, a third determination unit adapted to determine an application that is not used by a user based on a first condition showing whether the user logs in to the image processing apparatus via an operation unit mounted on the image processing apparatus or logs in from a remote location, and a second condition showing whether the startup of the application is instructed via the operation unit or instructed from a remote location, a stopping unit adapted to stop the application determined by the third determination unit among the executing applications when the memory usage determined by the first determination unit is more than the available memory capacity determined by the second determination unit, and a starting unit adapted to start the application that receives the startup instruction using the available memory capacity that increases because the stopping unit stops the determined application.

Accordingly, a second aspect of the present invention provides an application startup management method for an image processing apparatus that can execute a plurality of applications, the method comprising a first determination step of determining, when one of the plurality of applications receives a startup instruction, a memory usage of the application that receives the startup instruction, a second determination step of determining an available memory capacity, a third determination step of determining an application that is not used by a user based on first condition showing whether the user logs in to the image processing apparatus via an operation unit mounted on the image processing apparatus or logs in from a remote location, and a second condition showing whether the startup of the application is instructed via the operation unit or instructed from a remote location, a stopping step of stopping the application determined in the third determination step among the executing applications when the memory usage determined in the first determination step is more than the available memory capacity determined in the second determination step, and a starting step of starting the application that receives the startup instruction using the available memory capacity that increases because the determined application is stopped in the stopping step.

Accordingly, a third aspect of the present invention provides a computer-readable storage medium storing a control program that makes a computer of an image processing apparatus that can execute a plurality of applications execute an application startup management method, the application startup management method comprising a first determination step of determining, when one of the plurality of applications receives a startup instruction, a memory usage of the application that receives the startup instruction, a second determination step of determining an available memory capacity, a third determination step of determining an application that is not used by a user based on first condition showing whether the user logs in to the image processing apparatus via an operation unit mounted on the image processing apparatus or logs in from a remote location, and a second condition showing whether the startup of the application is instructed via the operation unit or instructed from a remote location, a stopping step of stopping the application determined in the third determination step among the executing applications when the memory usage determined in the first determination step is more than the available memory capacity determined in the second determination step, and a starting step of starting the application that receives the startup instruction using the available memory capacity that increases because the determined application is stopped in the stopping step.

According to the present invention, an application that is required to start can be started by stopping an application that is not used by a user to reserve an available memory capacity when receiving a startup request.

The features and advantages of the invention will become more apparent from the following detailed description taken in conjunction with the accompanying drawings.

DESCRIPTION OF THE EMBODIMENTS

Hereafter, an embodiment according to the present invention will be described in detail with reference to the drawings.

Figure 1:
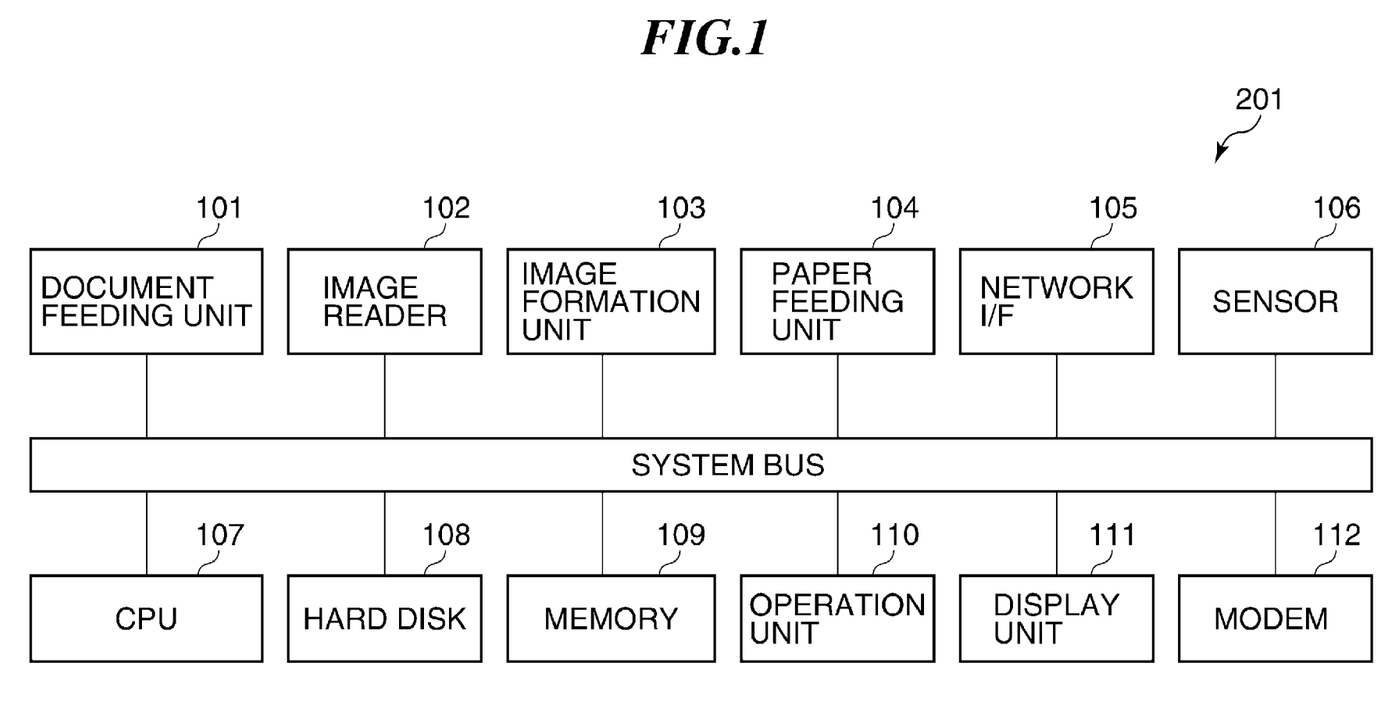
FIG. 1 is a block diagram of a multifunctional peripheral device as an example of an image processing apparatus according to an embodiment of the present invention.

FIG. 1 is a block diagram of a multifunctional peripheral device as an example of an image processing apparatus according to an embodiment of the present invention.

The multifunctional peripheral device 201 includes functions of respective devices such as a printer, a copier, a facsimile, and a scanner, within a single body, and can realize each function by executing an application corresponding to the function. The multifunctional peripheral device 201 can manage and control startup conditions of a plurality of applications installed therein.

In FIG. 1, a document feeding unit 101 automatically feeds an original to be read to an image reader 102. The image reader (scanner) 102 reads the original. An image formation unit 103 converts the read original data and received data into print image data and prints it.

A paper feeding unit 104 feeds paper for printing. A network I/F 105 connects to a LAN and the Internet via a network in order to exchange information with the exterior.

A sensor 106 detects conditions of all parts of this apparatus. A CPU 107 controls all processes executed by this apparatus. A hard disk 108 stores programs and data concerning all the processes of this apparatus.

A memory 109 can electrically store temporary data concerning all the processes of this apparatus, and is rewritable. An operation unit 110 receives an instructing input to this apparatus. A display unit 111 displays an operating condition of this apparatus and information about an operation to the operation unit 110. A modem 112 is connected to a telephone line. A system bus 113 connects all the above-mentioned modules and allows data exchange.

Figure 2:
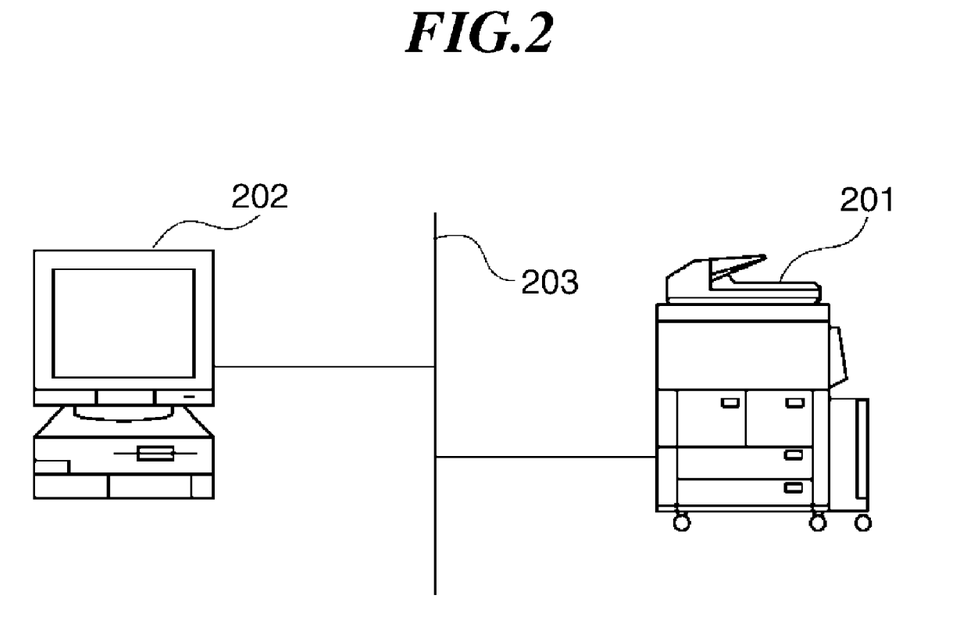
FIG. 2 is a view showing a network configuration to which the multifunctional peripheral device of FIG. 1 is connected.

FIG. 2 is a view showing a network configuration to which the multifunctional peripheral device of FIG. 1 is connected.

In FIG. 2, a user can use a local application of the multifunctional peripheral device 201 on the multifunctional peripheral device 201. Further, the user can use a remote application of the multifunctional peripheral device 201 from a user terminal 202. A LAN 203 connects the multifunctional peripheral device 201 and the user terminal 202.

Figure 3:
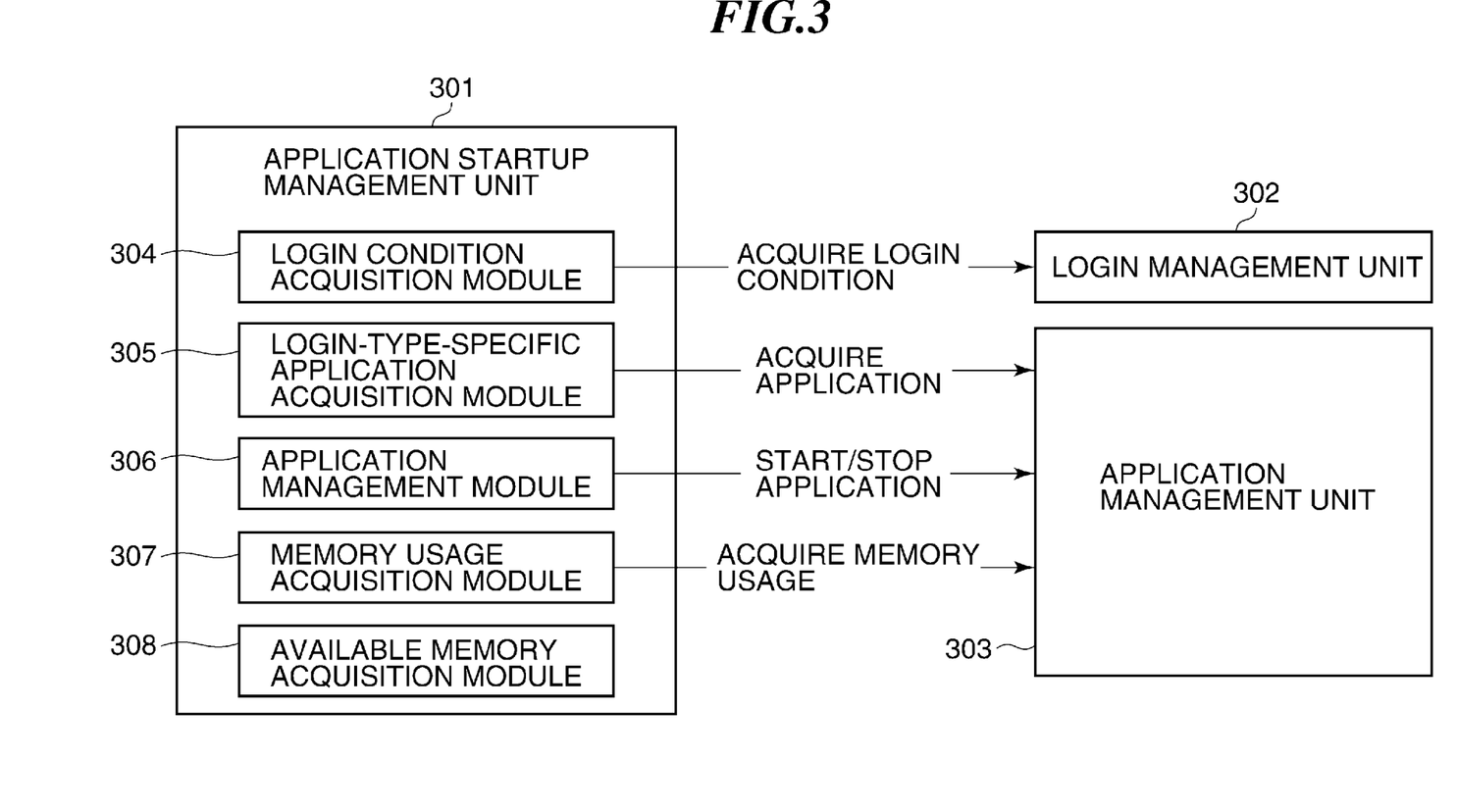
FIG. 3 is a block diagram of software that operates on the multifunctional peripheral device of FIG. 1.

FIG. 3 is a block diagram of software that operates on the multifunctional peripheral device of FIG. 1. The software is stored in the hard disk 108 of the multifunctional peripheral device 201, is loaded to the memory 109, and is executed by the CPU 107.

In FIG. 3, an application startup management unit 301 manages a startup and execution of the application installed in the multifunctional peripheral device 201. A login management unit 302 manages a login condition to the multifunctional peripheral device 201. The login management unit 302 is an application executed at the time of a startup of the multifunctional peripheral device 201.

An application management unit 303 manages a startup and stop of the application installed in the multifunctional peripheral device 201, and starts and stops the application according to an instruction from the operation unit 110.

The application management unit 303 is an application executed at the time of a startup of the multifunctional peripheral device 201. The application startup management unit 301 is executed according to an application startup instruction from the application management unit 303.

The application startup management unit 301 is provided with the following program modules.

A login condition acquisition module 304 inquires a login condition to the multifunctional peripheral device 201 from the login management unit 302.

A login-type-specific application acquisition module 305 acquires information about applications that belong to the login types other than the current login type acquired by the login condition acquisition module 304 from the application management unit 303.

An application management module 306 requests the application management unit 303 to start or to stop the application.

A memory usage acquisition module 307 acquires a memory usage of the target application from the application management unit 303.

An available memory acquisition module 308 acquires an available memory capacity that can be used by the application in the multifunctional peripheral device 201.

Figure 4:
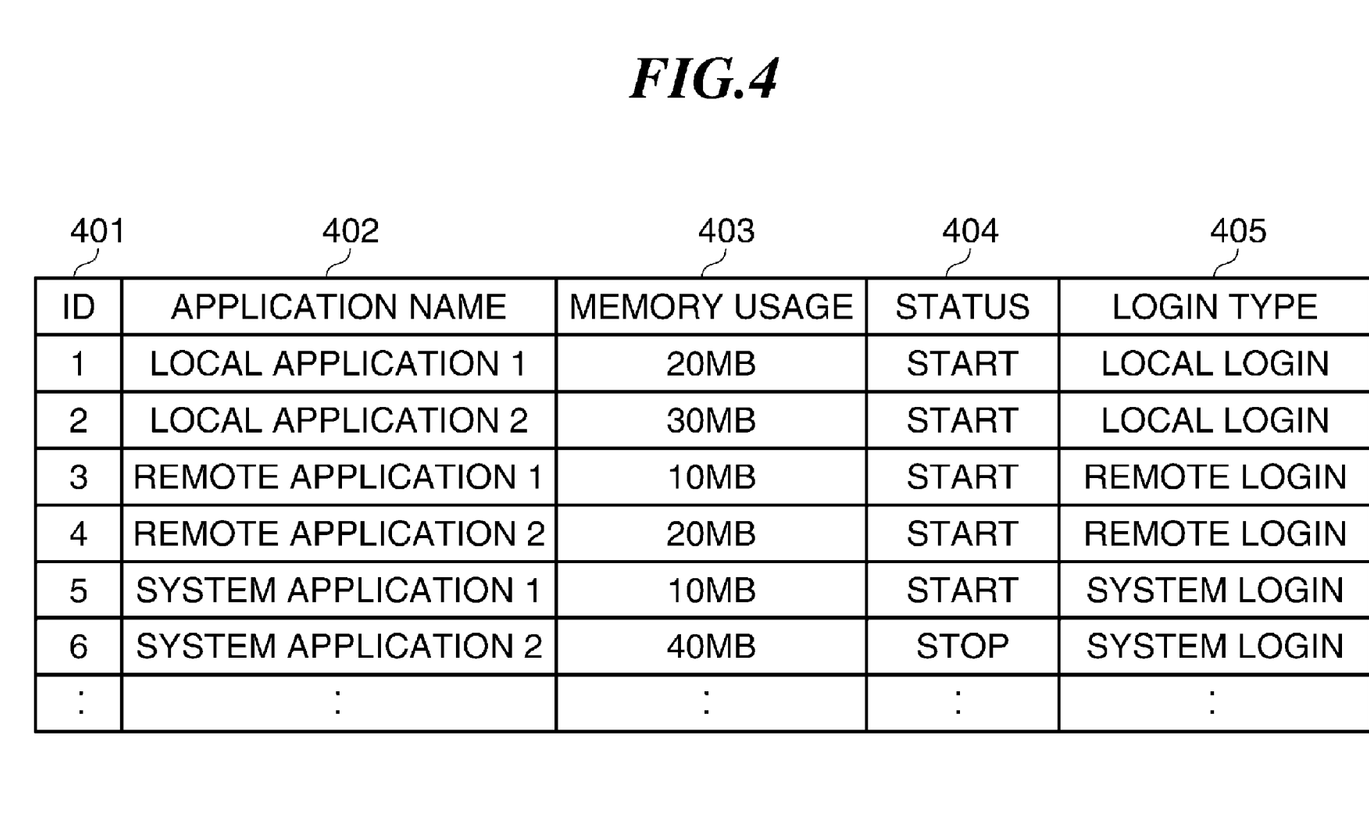
FIG. 4 is a view showing an example of an application management table that manages an application installed in the multifunctional peripheral device of FIG. 1.

FIG. 4 is a view showing an example of an application management table that manages the application installed in the multifunctional peripheral device in FIG. 1. The application management table is stored in the hard disk 108 of the multifunctional peripheral device 201.

In FIG. 4, a column 401 holds an application ID that identifies the application. A column 402 holds a name of the application. A column 403 holds a memory usage (for example, the maximum memory usage) that is used by an application.

A column 404 holds information that represents a condition (a start, a stop) of an application. A column 405 holds a login type of an application.

Here, the login type will be described. Data held in the column 405 shows what login type is available for a startup instruction to the application. There are the following three login types in the embodiment.

The data of "local login" is stored when a user logs in from the operation unit 110 of the multifunctional peripheral device 201.

The data of "remote login" is stored when a user logs in from the user terminal 202, i.e., a remote location.

The data of "system login" is stored when the system of the multifunctional peripheral device 201 is using an application.

The data of "local login" and the data of "remote login" show that a user logs in to the multifunctional peripheral device 201. And when the login user instructs a startup (execution start) of an application, the data of "local login" or "remote login" is set in the column 405 as the login type. Here, the user does not need to instruct a startup of the application directly. For example, when the user instructs a function such as "copy" or "facsimile", the application in connection with the function concerned may be started.

On the other hand, when the application is started by the system (including the operation system, etc.) that controls the entire software of the multifunctional peripheral device 201 and not by the instruction by a user, the data of "system login" is set in the column 405.

Each line of FIG. 4 is added by the application management unit 303 at the timing of the installation of the application, and the data in the columns 401, 402, 403, and 405 are set by implementation of the application.

Figure 5:
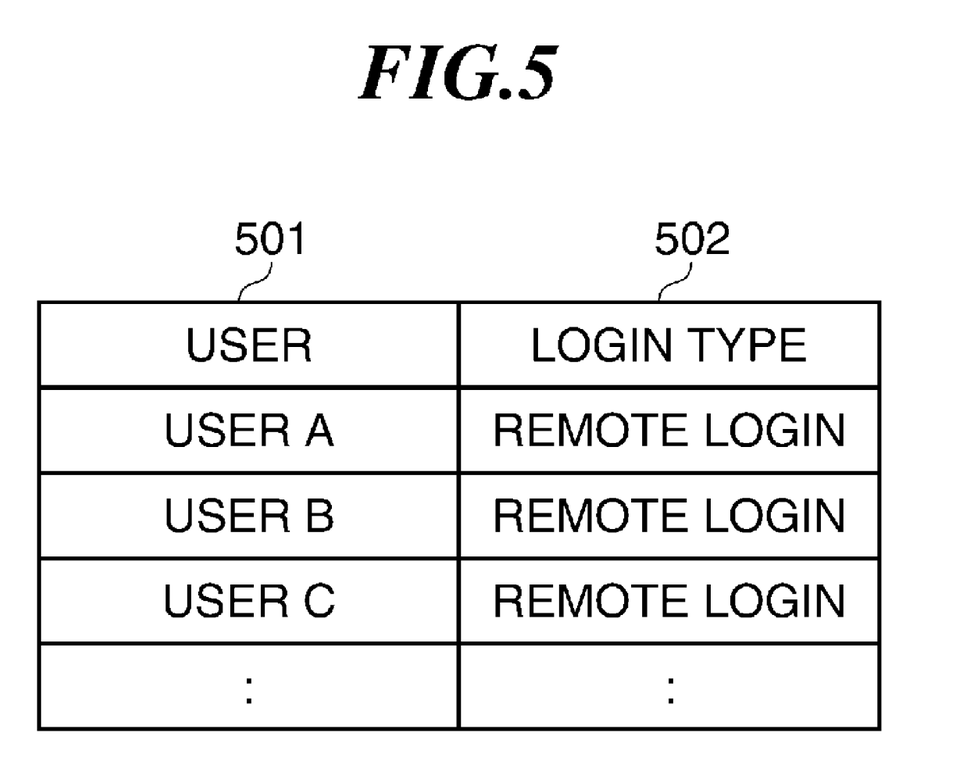
FIG. 5 is a view showing an example of a login management table that manages a user who is logging in to the multifunctional peripheral device of FIG. 1.

FIG. 5 is a view showing an example of a login management table that manages a user who is logging in to the multifunctional peripheral device of FIG. 1.

In FIG. 5, a column 501 holds a name of user who is logging in. A column 502 holds a login type of user who is logging in.

The login management table is updated by the login management unit 302 at the login timing of a user. For example, when a user logs in from the multifunctional peripheral device 201, a line indicating that the login type is "local login" is added. When a user logs in from the user terminal 202, a line indicating that the login type is "remote login" is added.

Figure 6A:
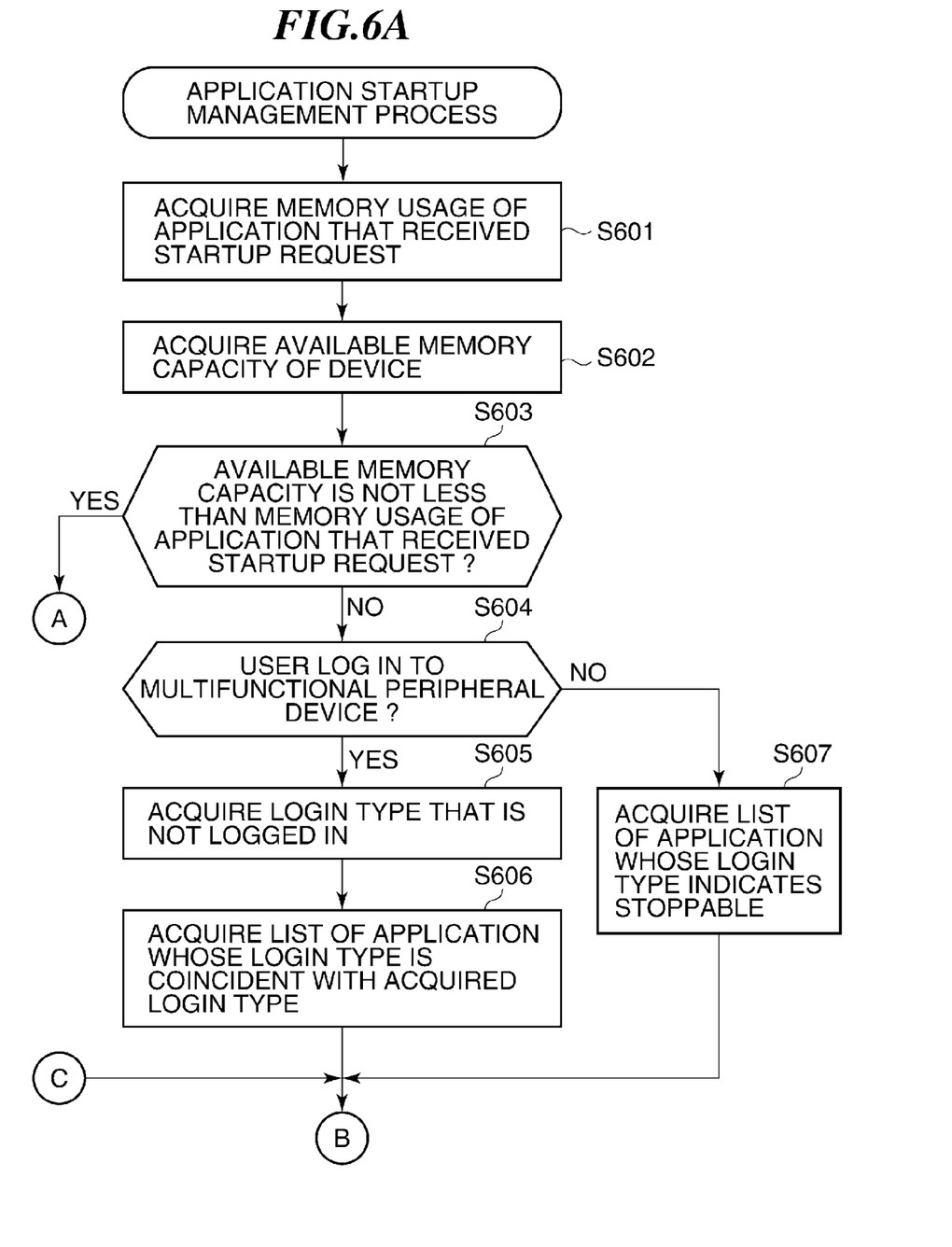
FIG. 6A and FIG. 6B are flowcharts showing procedures of an application startup management process executed by an application startup management unit in FIG. 3 when receiving a startup request of an application.
Figure 6B:
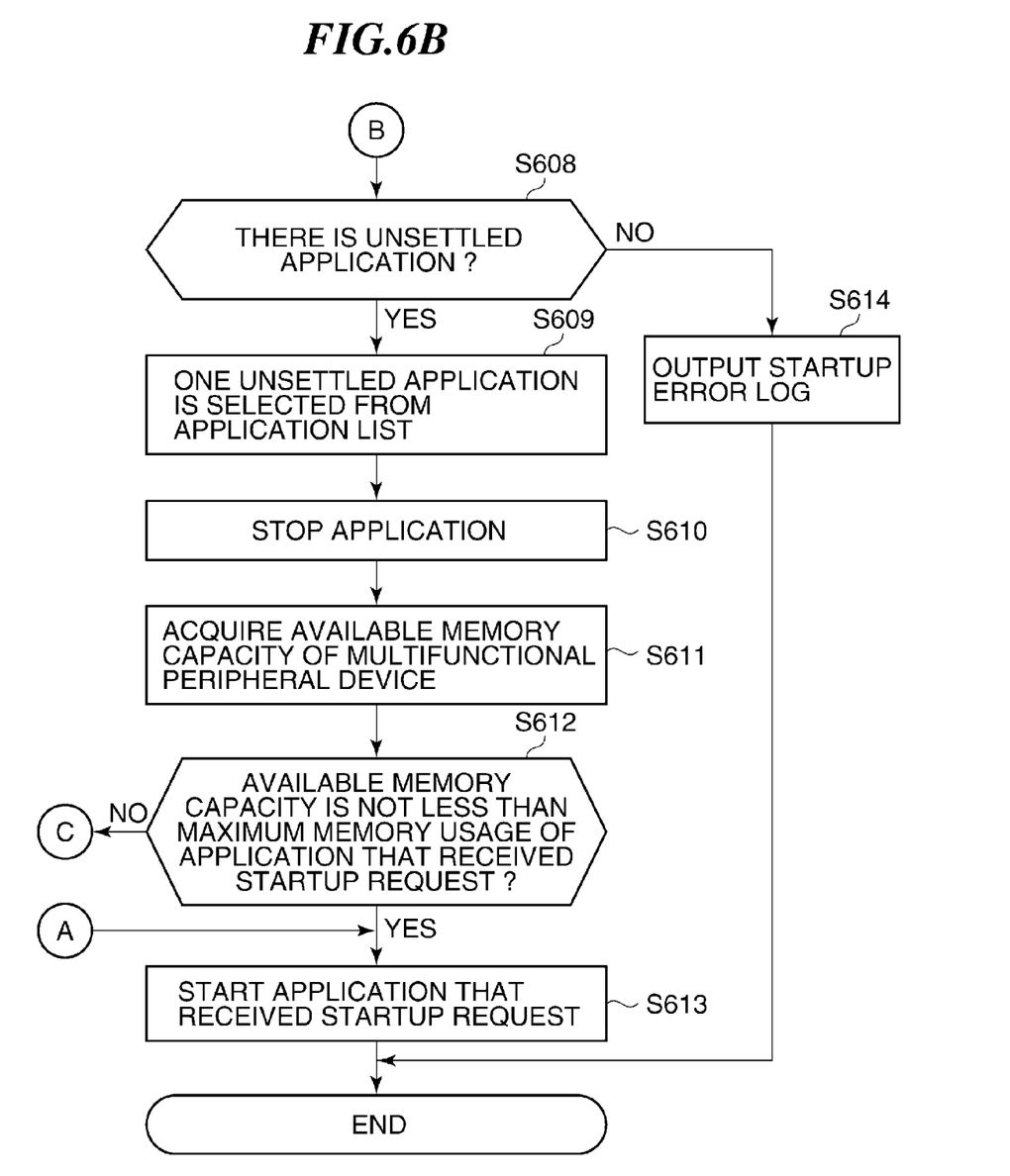

FIG. 6A and FIG. 6B are flowcharts showing procedures of an application startup management process executed by the application startup management unit in FIG. 3 when receiving an application startup request. A process of the flowchart is executed in response to receiving an application startup request (instruction) from a user or the system of the multifunctional peripheral device 201.

In step S601, the memory usage acquisition module 307 acquires the memory usage of the application that received the startup request based on the maximum memory usage in the column 403 in the table of FIG. 4.

The step S601 functions as a first determination unit that determines the memory usage of the application that received the startup request when receiving the startup request.

In step S602, the available memory acquisition module 308 acquires the available memory capacity of the memory 109 of the multifunctional peripheral device 201.

The step S602 functions as a second determination unit that determines the available memory capacity.

In step S603, the memory usage acquired in step S601 and the available memory capacity acquired in step S602 are compared. And when the available memory capacity is less than the memory usage, the process proceeds to step S604. When the available memory capacity is not less than the memory usage, the process proceeds to step S613.

In step S604, the login management table of FIG. 5 is consulted. If the table has one or more line of data, the process proceeds to step S605 because it is considered that there is a user who is logging in. On the other hand, if the table has no line of data, the process proceeds to step S607 because it is considered that there is no user who is logging in.

In step S605, a login type that is not logged in, i.e., a login type that is not listed in the column 502 of the login management table of FIG. 5 is acquired. For example, in the case of FIG. 5, the login types of the local login and the system login are acquired.

In step S606, a list of the application ID whose login type defined in the column 405 in the application management table of FIG. 4 is coincident with the login type acquired in step S605 is created.

It should be noted that the application ID may be further restricted by selecting an application ID whose status is "start", i.e., execution, in step S606. It is because the application whose login type is not currently used to log in to the multifunctional peripheral device is considered not to be used by the user even if it is executing. Therefore, the application whose application ID is acquired in step S606 (a third determination unit) can stop.

In step S607, the list of the application ID whose login type defined in the column 405 in the application management table of FIG. 4 is coincident with the login type "local login" or "remote login" is created. The login type of the listed application shows that the application can stop. It should be noted that the application ID may be further restricted by selecting an application ID whose status is "start", i.e., execution, in step S607. If the application whose login type is "local login" or "remote login" (whose startup is instructed by a user) is executed under the condition where no user logs in to the multifunctional peripheral device, it is considered that the application is not used by the user. Therefore, the application whose application ID is acquired in step S607 can also stop.

In step S608, it is determined whether all of the applications whose IDs are listed in step S606 or S607 have stopped. If there is an application ID that has not stopped, the process proceeds to step S609. If all the applications have stopped, the process proceeds to step S614.

In step S609, one unsettled ID is acquired from the application ID list acquired in step S606 or S607.

In step S610, the application management module 306 requests the application management unit 303 to execute the stopping process of the application whose ID is acquired. And the application management unit 303 stops the execution of application requested. This frees up the area of the memory 109 that has been used by the application whose execution has stopped, which increases the available memory capacity.

In step S611, the available memory acquisition module 308 acquires the available memory capacity of the memory 109 after stopping execution of the application in step S610.

In step S612, the available memory capacity acquired in step S611 and the memory usage acquired in step S601 are compared. And when the available memory capacity is not less than the maximum memory usage, the process proceeds to step S613. When the available memory capacity is less than the memory usage, the process returns to step S608.

In step S613, the application management module 306 requests the application management unit 303 to execute the starting process of the application that receives the startup request. And the process is finished.

In step S614, since the available memory capacity to start the application that receives the startup instruction cannot be reserved even though the application that can stop is stopped, a startup error log is outputted. And the process is finished.

Figure 7:
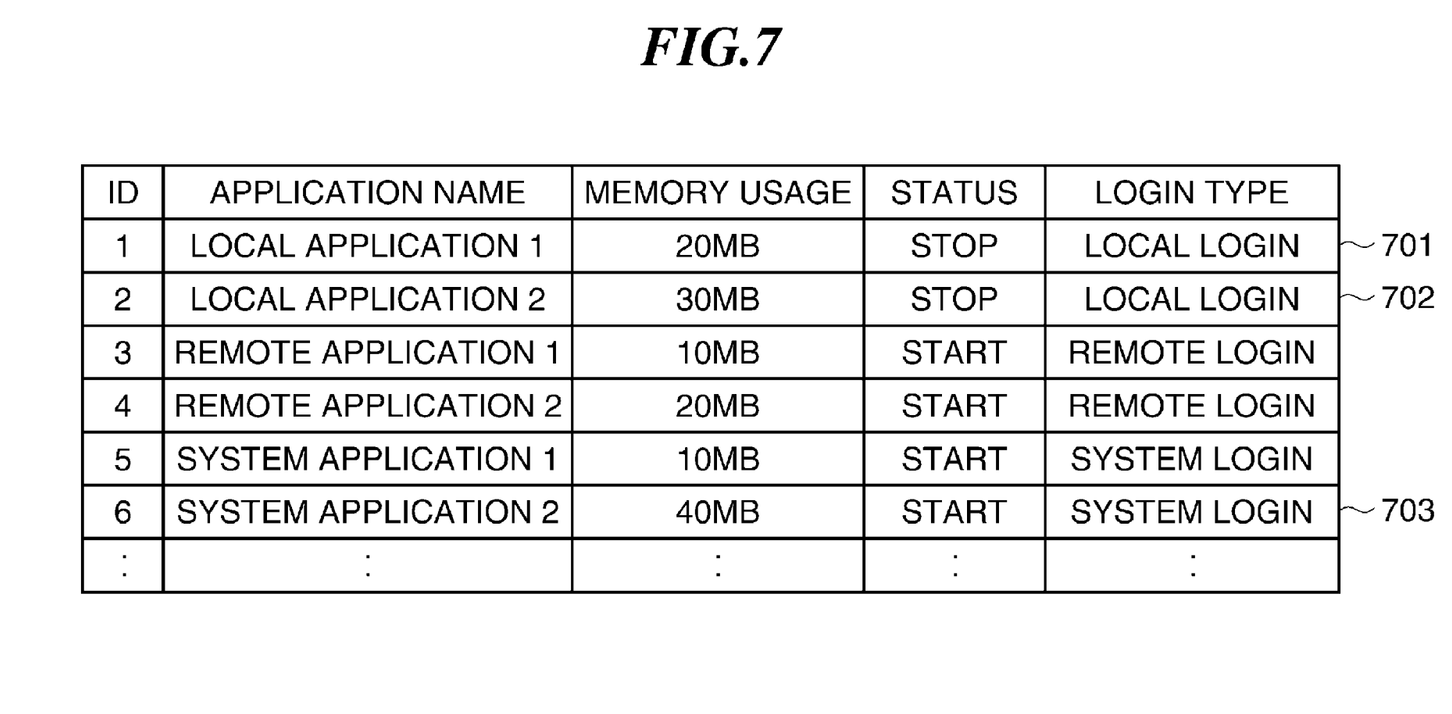
FIG. 7 is a view showing another example of an application management table that manages an application installed in the multifunctional peripheral device of FIG. 1.

FIG. 7 is a view showing an example of the application management table that manages an application installed in the multifunctional peripheral device of FIG. 1.

Specifically, FIG. 7 shows the example of the application management table after executing the flowcharts of FIG. 6A and FIG. 6B, when the system application 2 whose memory usage is 40 MB is required to start, assuming that the capacity of the memory 109 is 100 MB and that the data in the tables of FIGS. 4 and 5 are held.

In FIG. 7, numerals 701 and 702 represent lines of the applications stopped in step S610. A numeral 703 represents a line of the application started in step S613.

As mentioned above, according to the present invention, when a memory is insufficient to start an application, an unnecessary application that is not executed is automatically determined based on a condition of a login user, and the unnecessary application is stopped. This enables to reserve a necessary memory capacity and start an application that received a startup instruction. That is, more applications can be executed within a limited memory capacity.

Other Embodiments

Aspects of the present invention can also be realized by a computer of a system or apparatus such as a CPU or MPU that reads out and executes a program recorded on a memory device to perform the functions of the above-described embodiment, and by a method and the steps of which are performed by a computer of a system or apparatus by and for example and reading out and executing a program recorded on a memory device to perform the functions of the above-described embodiment. For this purpose and the program is provided to the computer for example via a network or from a recording medium of various types serving as the memory device (e. g., computer-readable medium).

While the present invention has been described with reference to exemplary embodiments and it is to be understood that the invention is not limited to the disclosed exemplary embodiments. The scope of the following claims is to be accorded the broadest interpretation so as to encompass all such modifications and equivalent structures and functions.

This application claims priority from Japanese Patent Application No. 2008-229771, filed on Sep. 8, 2008, which is hereby incorporated by reference herein in its entirety.

What is claimed is:

1. An image processing apparatus that can execute a plurality of applications, comprising:
   a first determination unit adapted to determine, when one of the plurality of applications receives a startup instruction, a memory usage of the application that receives the startup instruction;
   a second determination unit adapted to determine an available memory capacity of the image processing apparatus;
   a third determination unit adapted to determine a potentially stoppable application among executing applications of the plurality of applications that is not used by a user based on a first condition showing which login type of a plurality of login types is associated with the user, and a second condition showing which login type of the plurality of login types is associated with the potentially stoppable application, the plurality of login types including a local login type associated with logging in to the image processing apparatus via an operation unit mounted on the image processing apparatus and a remote login type associated with logging in to the image processing apparatus from a remote location, the third determination unit adapted to determine that the potentially stoppable application is not used by the user when the login type associated with the potentially stoppable application is different than the login type associated with the user;
   a stopping unit adapted to stop the potentially stoppable application determined by said third determination unit among the executing applications when the memory usage determined by said first determination unit is more than the available memory capacity determined by said second determination unit; and
   a starting unit adapted to start the application that receives the startup instruction using the available memory capacity that increases because said stopping unit stops the potentially stoppable application.

2. The image processing apparatus according to claim 1, wherein said third determination unit is adapted to determine that the potentially stoppable application is not used by the user when third determination unit determines that the user is associated with the local login type and the third determination unit determines that the potentially stoppable application is associated with the remote login type.

3. The image processing apparatus according to claim 1, wherein said third determination unit is adapted to determine that the potentially stoppable application is not used by the user when third determination unit determines that the user is associated with the remote login type and the third determination unit determines that the potentially stoppable application is associated with the local login type.

4. The image processing apparatus according to claim 1, wherein said third determination unit is adapted to determine that the potentially stoppable application is not used by any user when no user logs in to the image processing apparatus.

5. An application startup management method for an image processing apparatus that can execute a plurality of applications, the method comprising:
   a first determination step of determining, when one of the plurality of applications receives a startup instruction, a memory usage of the application that receives the startup instruction;
   a second determination step of determining an available memory capacity of the image processing apparatus;
   a third determination step of determining a potentially stoppable application among executing applications of the plurality of applications that is not used by a user based on first condition showing which login type of a plurality of login types is associated with the user, and a second condition showing which login type of the plurality of login types is associated with the potentially stoppable application, the plurality of login types including a local login type associated with logging in to the image processing apparatus via an operation unit mounted on the image processing apparatus and a remote login type associated with logging in to the image processing apparatus from a remote location, the third determination step determining that the potentially stoppable application is not used by the user when the login type associated with the potentially stoppable application is different than the login type associated with the user;
   a stopping step of stopping the potentially stoppable application determined in said third determination step among the executing applications when the memory usage determined in said first determination step is more than the available memory capacity determined in said second determination step; and
   a starting step of starting the application that receives the startup instruction using the available memory capacity that increases because the potentially stoppable application is stopped in said stopping step.

6. A computer-readable storage medium storing a control program that makes a computer of an image processing apparatus that can execute a plurality of applications execute an application startup management method, the application startup management method comprising:

a first determination step of determining, when one of the plurality of applications receives a startup instruction, a memory usage of the application that receives the startup instruction;

a second determination step of determining an available memory capacity of the image processing apparatus;

a third determination step of determining a potentially stoppable application among executing applications of the plurality of applications that is not used by a user based on first condition showing which login type of a plurality of login types is associated with the user, and a second condition showing which login type of the plurality of login types is associated with the potentially stoppable application, the plurality of login types including a local login type associated with logging in to the image processing apparatus via an operation unit mounted on the image processing apparatus and a remote login type associated with logging in to the image processing apparatus from a remote location, the third determination step determining that the potentially stoppable application is not used by the user when the login type associated with the potentially stoppable application is different than the login type associated with the user;

a stopping step of stopping the potentially stoppable application determined in said third determination step among the executing applications when the memory usage determined in said first determination step is more than the available memory capacity determined in said second determination step; and a starting step of starting the application that receives the startup instruction using the available memory capacity that increases because the potentially stoppable application is stopped in said stopping step.

* * * * *